United States Patent [19]

Hatanaka et al.

[11] Patent Number: 5,050,001
[45] Date of Patent: Sep. 17, 1991

[54] PRINTING SYSTEM WITH LIQUID CRYSTAL SHUTTER MATRIX PANEL

[75] Inventors: Isamu Hatanaka; Masaaki Takimoto, both of Tokyo, Japan

[73] Assignee: Fuji Photo Film Co., Ltd., Kanagawa, Japan

[21] Appl. No.: 549,038

[22] Filed: Jul. 6, 1990

[30] Foreign Application Priority Data

Jul. 7, 1989 [JP] Japan .................................. 1-176818
Jul. 7, 1989 [JP] Japan .................................. 1-176819

[51] Int. Cl.$^5$ ...................... H04N 1/036; H04N 1/10; B41J 2/445; G01D 15/14
[52] U.S. Cl. .................................. 358/302; 346/107 R
[58] Field of Search .............. 358/296, 302, 300, 496, 358/483; 346/107 R, 160; 350/331 R, 345

[56] References Cited

U.S. PATENT DOCUMENTS

| | | | |
|---|---|---|---|
| 4,300,170 | 11/1981 | Sakamoto | 358/296 |
| 4,605,972 | 8/1986 | Hatanaka | 346/160 |
| 4,633,328 | 12/1986 | Saito | 358/302 |
| 4,728,972 | 3/1988 | Stephany | 346/160 |
| 4,899,224 | 2/1990 | Ooba | 346/160 |

Primary Examiner—Benjamin R. Fuller
Assistant Examiner—Scott A. Rogers
Attorney, Agent, or Firm—Sughrue, Mion, Zinn, Macpeak & Seas

[57] ABSTRACT

A printing system includes a liquid crystal shutter matrix panel, a light source for illuminating the liquid crystal shutter matrix panel from its back, and a photosensitive medium disposed in confronting relation to the illuminating means with the liquid crystal shutter matrix panel interposed therebetween. A positioning unit positions the liquid crystal shutter matrix panel and the photosensitive medium longitudinally and transversely with respect to each other. An image data generator generates image data from a desired image. The shutter of the liquid crystal shutter matrix panel is driven by a liquid crystal driver on the basis of the image data generated by the image data generator. An image formed by the liquid crystal shutter matrix panel is focused onto the photosensitive medium by a focusing optical system, thereby reproducing the image on the photosensitive medium.

9 Claims, 4 Drawing Sheets

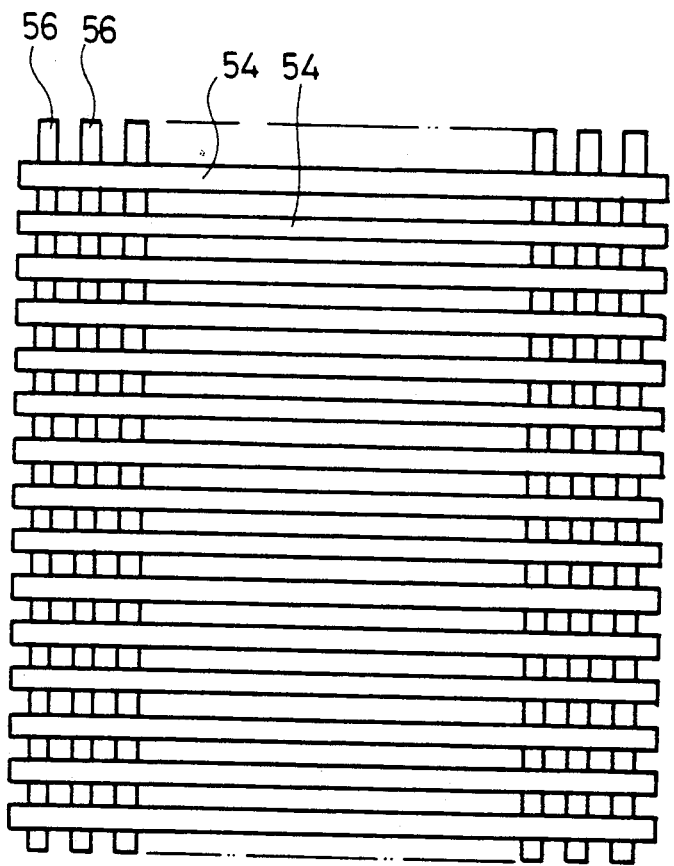

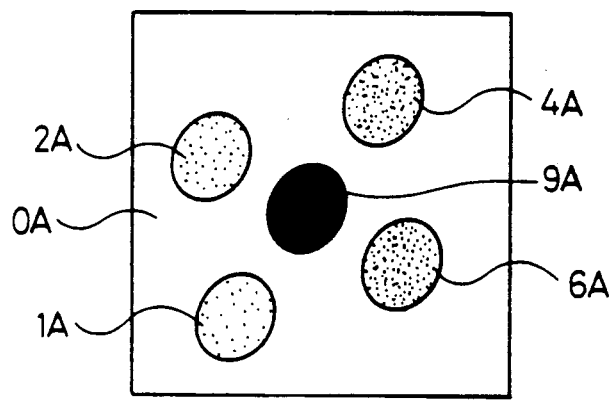
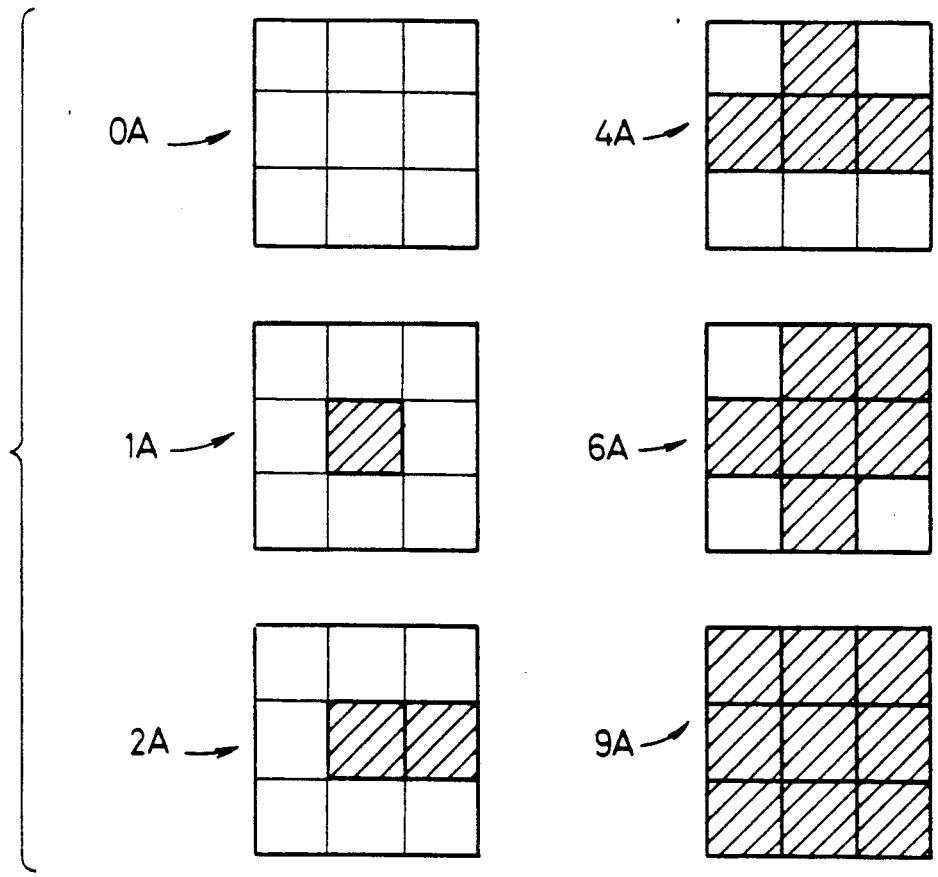

PRINTING SYSTEM WITH LIQUID CRYSTAL SHUTTER MATRIX PANEL

BACKGROUND OF THE INVENTION

The present invention relates to a printing system for converting image information carried on a photographic film or an original into digital image information, storing thee digital image information in a computer or the like, and then reproducing an image based on the image information from the computer, using a liquid crystal shutter matrix panel.

Heretofore, DPE systems are used to print images carried on photographic films. Printouts produced by the DPE systems are sufficiently fine even if the printed images are continuous-tone images. Therefore, the images reproduced by the DPE systems are highly faithful to the original images. However, the DPE systems are unable to process original images and print processed images. For example, it is impossible for a DPE system to remove an unnecessary background image, correct a blurred image into a sharper image, distort an original image, add characters to an image, convert a continuous-tone image into a line-art image, and produce an animated image from a still image.

With the recent advance of computer-applied technology, there have been developed various arrangements for printing images based on digital image information. These printing systems are effective in processing image information for computer graphics. More specifically, the printing systems photoelectrically read an image carried on a photographic film or an original, introduce the read image information as digital image information into a computer, or produce desired digital image information with a computer according to simulating software, and send the image to an output device such as a printer, a display, or the like.

Known printing systems which employ computers include a thermal printer having a thermal head for thermally reproducing image information on an output sheet and an ink-jet printer for applying an ink jet to an output sheet to reproduce image information. The thermal printer and the ink-jet printer are relatively simple in structure, small in size, and inexpensive to manufacture. However, no thermal and ink-jet printers of sufficient performance are available printing continuous-tone images and highly fine images.

Other computerized printing systems include laser and CRT printers for electrophotographically reproducing images with a laser beam and a cathode-ray tube (CRT). The laser and CRT printers are necessarily large in size and highly costly as they use a laser beam and a CRT. Even if a highly photosensitive material is employed as an output medium, the pixel density which can be obtained of a reproduced image is about 10 lines/mm at most. For the reproduction of finer images, more complex and larger laser and CRT printers must be used to achieve desired printing performance.

As described above, conventional image printing systems such as DPE systems which can easily be handled by amateurs or laymen are not capable of processing images. Available image output systems with computers such as microcomputers are either inexpensive printing systems which cannot print continuous-tone images highly finely, or large and expensive business-use printing systems which can reproduce highly fine images.

SUMMARY OF THE INVENTION

It is a major object of the present invention to provide a printing system which is of a relatively simple arrangement, but can print highly fine images, and which is inexpensive enough for amateurs and laymen to use the printing system.

Another object of the present invention is to provide a printing system comprising a liquid crystal shutter matrix panel, illuminating means for illuminating the liquid crystal shutter matrix panel from the back thereof, a photosensitive medium disposed in confronting relation to the illuminating means with the liquid crystal shutter matrix panel interposed therebetween, positioning means for positioning the liquid crystal shutter matrix panel and the photosensitive medium longitudinally and transversely with respect to each other, image data generating means for generating image data, driving means for driving a shutter of the liquid crystal shutter matrix panel based on the image data generated by the image data generating means, and focusing means for focusing an image formed by the liquid crystal shutter matrix panel onto the photosensitive medium.

Still another object of the present invention is to provide the printing system wherein the image data generating means comprises illuminating means for illuminating an image carried on an original, and image reading means movable with respect to the original, for reading light reflected or transmitted by the image which is illuminated by the illuminating means, thereby to produce the image data, whereby the shutter of the liquid crystal shutter matrix panel can be driven by the driving means based on the image data.

Yet another object of the present invention is to provide the printing system wherein the liquid crystal shutter matrix panel comprises a liquid crystal panel composed of a pair of transparent plates and a liquid crystal sealed therebetween, polarizing films mounted on the liquid crystal panel, drive electrodes mounted in the liquid crystal panel and drivable depending on the image data by the driving means.

Yet still another object of the present invention is to provide the printing system wherein the positioning means comprises means for moving the photosensitive medium and the original in synchronism with each other until the photosensitive medium and the original are positioned with respect to the liquid crystal shutter matrix panel and the image reading means, respectively.

A further object of the present invention is to provide the printing system wherein the image reading means comprises a photoelectric transducer for converting the light reflected by or transmitted through the image into an electric signal to be converted into the image data, and focusing means for focusing the light reflected by or transmitted through the image onto the photoelectric transducer.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a plan view of an electrode structure of the liquid crystal shutter matrix panel; and FIGS. 4a and 4b are views illustrative of the concept of expressing a multi-value image based on binary image data.

DETAILED DESCRIPTION OF THE PREFERRED EMBODIMENT

Figure 1:
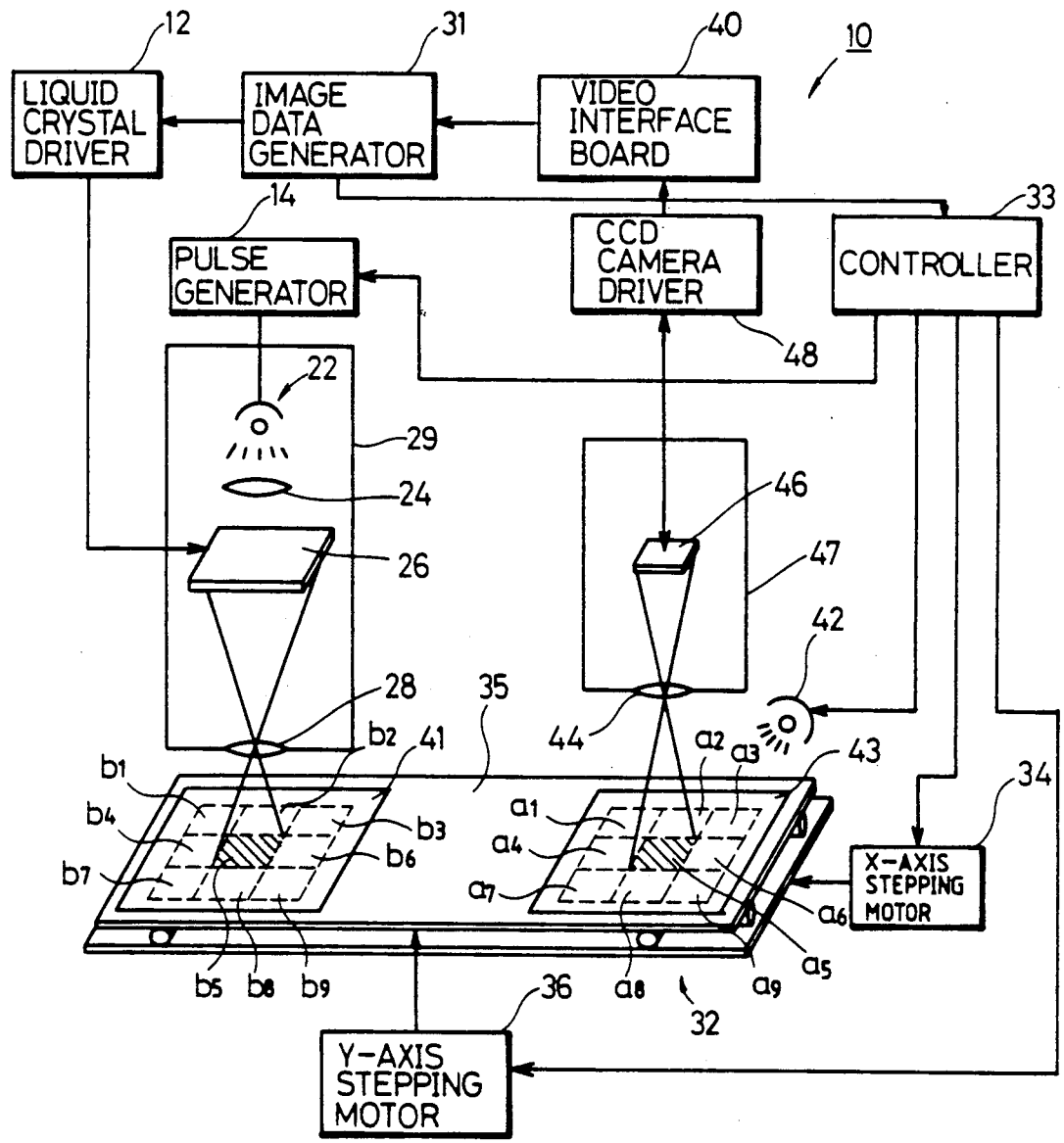
FIG. 1 is a perspective view, partly in block form, of a printing system with a liquid crystal shutter matrix panel according to the present invention.

FIG. 1 shows a printing system incorporating a liquid crystal shutter matrix panel according to the present invention.

As shown in FIG. 1, the printing system, generally designated by the reference numeral 10, comprises an image recorder 29 which includes a liquid crystal shutter matrix panel 26, a light source 22 for illuminating the liquid crystal shutter matrix panel 26 from its back, a relay lens 24 for converting illuminating light rays from the light source 22 into parallel light rays, and a focusing optical system 28 for focusing an image formed on the liquid crystal shutter matrix panel 26 onto a photosensitive medium 41. The printing system 10 also comprises a light source 42 for irradiating an image carried on an original 43 and an image reader 47 for reading the image on the original 43, the image reader 47 including a lens system 44 for directing light reflected by the original 43 onto a CCD (charge-coupled device) camera 46 which detects the reflected light.

The liquid crystal shutter matrix panel 26 is illuminated from its back by the light source 22 which is controlled by a pulse generator 14. The image recorder 29 is supplied with digital image data, through a liquid crystal driver 12 which drives the liquid crystal shutter matrix panel 26, from an image data generator 31 which comprises a data processor such as a microcomputer or the like. An image which is formed by the liquid crystal shutter matrix panel 26 is focused onto the photosensitive medium 41 by the focusing optical system 28.

The photosensitive medium 41 is placed on a support table 35 of a positioning unit 32 which can be moved longitudinally and transversely in the X- and Y-axis directions by respective X- and Y-axis stepping motors 34, 36. The photosensitive medium 41 is positioned in a recording position aligned with the image recorder 29 by the support table 35 which is controlled by the X- and Y-axis stepping motors 34, 36.

The original 43 is also placed on the support table 35 and positioned in a reading position aligned with the image reader 47 by the support table 35. The image carried on the original 43 is illuminated with light emitted from the light source 42. The light from the light source 42 is reflected by the original 43 and detected by the CCD camera 46 through the lens system 44. A signal representing the reflected light that is detected by the CCD camera 46 is sent through a CCD camera driver 48 and a video interface board 40 to the image data generator 31.

The image data generator 31 controls a controller 33 which then controls the pulse generator 14, the light source 42, and the X- and Y-axis stepping motors 34, 36.

The printing system according to the present invention is constructed as described above. Operation and advantages of the printing system will be described below.

The image carried on the original 43 is read out as follows:

The original 43 placed on the support table 35 is positioned in the reading position below the image reader 47 by the positioning unit 32. As shown in FIG. 1, the surface area of the original 43 is divided into nine regions $a_1$ through $a_9$ which bear respective images. First, the original 43 is positioned so that the image in the region $a_5$, for example, is read out. At this time, the positioning unit 32 is driven by the X- and Y-axis stepping motors 34, 36 to actuate feed screws (not shown), thereby moving the support table 35 as an XY table in the manner well known in the art.

The image in the region $a_5$ is irradiated with light emitted from the light source 42, and light reflected by the original 43 and containing image information relative to the image in the region $a_5$ is photoelectrically read by the CCD camera 46. The image information which is read by the CCD camera 46 is delivered as an image signal through the CCD camera driver 48 to the video interface board 40, which serves as a computer input unit.

The image in the region $a_5$ of the original 43 is read out in the manner described above. The read image information is then sent from the video board 40 to the image data generator 31 in the form of a computerized image processor. The image information which is supplied to the image data generator 31 is processed thereby in various processing modes for the removal of a background image, the conversion into a line-art image, the improvement of edge sharpness, and the conversion of gradations or tones, for example.

The image thus read out is recorded as follows:

The image data generator 31 to which the image information has been supplied applies a command to the controller 3 to start operating. In response to the command, the controller 33 drives the X- and Y-axis stepping motors 34, 36 to actuate the positioning unit 32 to move the support table 35 until the photosensitive medium 41 on the support table 35 is positioned in the recording position below the image recorder 29. More specifically, the photosensitive medium 41 also has its surface divided into nine regions $b_1$ through $b_9$ corresponding respectively to the regions $a_1$ through $a_9$ of the original 43. At this time, the region $b_5$ corresponding to the region $a_5$ is positioned with respect to the image recorder 29.

Then, the controller 33 energizes the pulse generator 14 to turn on the light source 22, thereby illuminating the liquid crystal shutter matrix panel 26 from its back. The light source 22 may comprise, for example, a xenon flashtube, a tungsten lamp, a halogen lamp, a metal halide lamp, or a fluorescent lamp. Depending on the lamp used, a mechanical shutter may also be used in combination with the liquid crystal shutter matrix panel 26.

In order to utilize the illuminating light from the light source 22 with high efficiency, the light is converted into parallel light by the relay lens 24 and then applied to the liquid crystal shutter matrix panel 26. The relay lens 24 may be dispensed with if the efficiency with which the illuminating light is utilized is not lowered.

After the above preparatory operation, the image data generator 31 supplies the image data to the liquid crystal driver 12. The image data thus supplied are binary data (digital data), which turn on or off X- and Y-axis drive electrodes (described later) of the liquid crystal shutter matrix panel 26 so that liquid crystal cells at the points of intersection between the X- and Y-axis drive electrodes pass or block the illuminating light applied from behind the liquid crystal shutter matrix panel 26.

Figure 2:
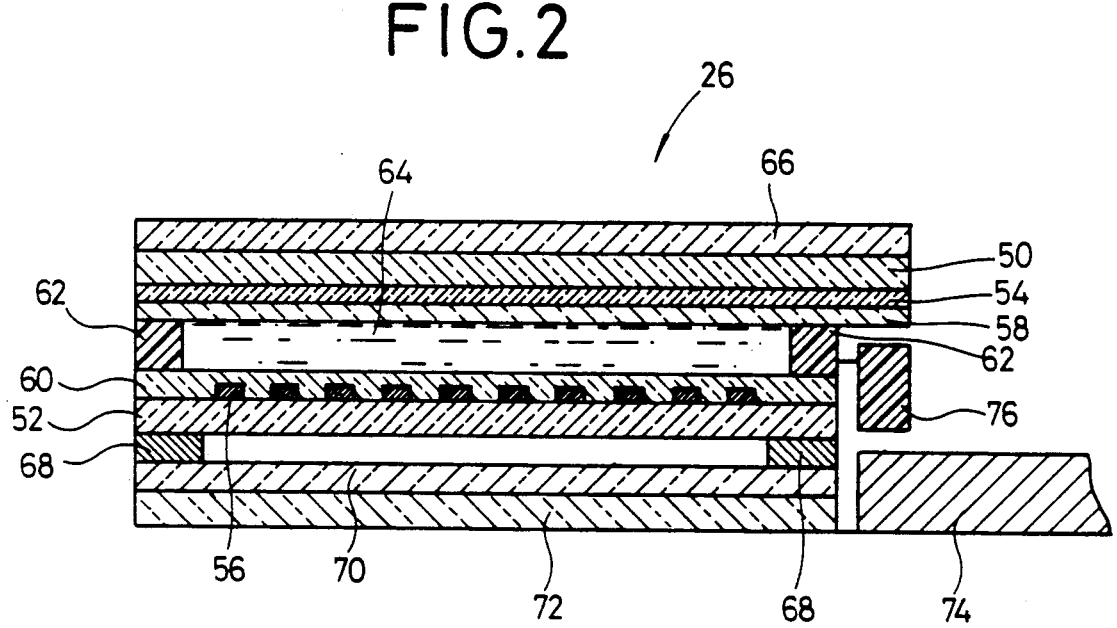
FIG. 2 is an enlarged vertical cross-sectional view of the liquid crystal shutter matrix panel.

The liquid crystal shutter matrix panel 26 comprises a known simple matrix or an active matrix such as a TFT (Thin Film Transistor) matrix or an MIM (Metal Insulator Metal) matrix. More specifically, as shown in FIG. 2, the liquid crystal shutter matrix panel 26 has an upper glass plate 50 and a lower glass plate 52 spaced from each other in confronting relation. The upper and lower glass plates 50, 52 support, on their confronting inner surfaces, an array of transparent transverse electrodes (Y-axis drive electrodes) 54 and an array of transparent longitudinal electrodes (X-axis drive electrodes) 56, respectively. Orientation films 58, 60 for orienting nematic liquid crystal molecules, for example, are formed on the surfaces of the transverse electrodes 54 and the longitudinal electrodes 56, respectively.

As illustrated in FIG. 3, the transverse electrodes 54 and the longitudinal electrodes 56 are directed perpendicularly to each other. The orientation films 58, 60 are spaced from each other in confronting relation, with a sealing member 62 sandwiched therebetween. A twisted nematic liquid crystal 64, for example, is sealed in the gap which is defined by and between the orientation films 58, 60 and the sealing member 62. The upper and lower glass plates 50, 52 and the liquid crystal 64 jointly serve as a liquid crystal panel. The liquid crystal panel, the drive electrodes 54, 56, and the sealing member 62 constitute a liquid crystal shutter.

The orientation films 58, 60 orient molecules of the liquid crystal 64 in directions that are 90° spaced from each other at the respective surfaces of the transverse electrodes 54 and the longitudinal electrodes 56. A polarizing plate 66 is disposed on the outer surface of the upper glass plate 50, the polarizing plate 66 having a polarizing axis aligned with the direction in which the liquid crystal molecules are oriented at the surface of the transverse electrodes 54. A metal mask 68 is disposed on the outer surface of the lower glass plate 52, and a filter 70 is mounted on the metal mask 68. Another polarizing plate 72 is placed on the outer surface of the filter 70, the polarizing plate 72 having a polarizing axis aligned with the polarizing axis of the polarizing plate 66.

The liquid crystal shutter matrix panel 26 of the above construction is supported on a printed-circuit board 74. In operation, a drive voltage is applied between the transverse electrodes 54 and the longitudinal electrodes 56 through an electrically conductive rubber connector 76.

When no drive voltage is applied between the transverse electrodes 54 and the longitudinal electrodes 56, light falling on the liquid crystal shutter matrix panel 26 does not pass therethrough. Conversely, when a drive voltage is applied between the transverse electrodes 54 and the longitudinal electrodes 56, the liquid crystal shutter matrix panel 26 transmits applied light therethrough. The transmittance of light which is transmitted through the liquid crystal shutter matrix panel 26 can be controlled by varying the value of the drive voltage. Therefore, an continuous-tone image having different tones or gradations can be printed using the liquid crystal shutter matrix panel 26.

In the illustrated embodiment, binary image data are processed by a multi-imaging process to reproduce a continuous-tone image as a collection of binary images constructed of successive pixels while the photosensitive medium 41 is being moved under the control of the controller 33. In this manner, highly fine images can be printed.

When the image data are supplied from the image data generator 31 to the liquid crystal driver 12 and the liquid crystal shutter matrix panel 26 is driven, an image is formed on the liquid crystal shutter matrix panel 26. The image, i.e., light which has passed through the liquid crystal shutter matrix panel 26, is focused onto the region $b_5$ of the photosensitive medium 41 by the focusing optical system 28. Therefore, the image which corresponds to the image in the region $a_5$ of the original 43 is recorded in the region $b_5$ of the photosensitive medium 41.

In this manner, the images in the regions $a_1$ through $a_9$ of the original 43 are successively read out, and successively recorded in the regions $b_1$ through $b_9$ of the photosensitive medium 43.

The focusing optical system 28 is a size-reducing optical system for dividing the surface area of the photosensitive medium 30 into the above regions and printing images in the divided regions through the multi-imaging process while the photosensitive medium 41 is being moved by the positioning unit 32. Depending on the image to be printed, the focusing optical system 28 may be a size-enlarging optical system.

The photosensitive medium 41 may be made of a silver-salt photographic material, an instant photographic material, an ISO 100 photographic material, or the like. The printing system of the above structure makes it possible to reproduce highly fine images on a highly photosensitive medium since the printing system well exploits the characteristics of the material.

As described above, the image data supplied from the image data generator 31 to the image recorder 29 are binary image data converted from a continuous-tone image (multi-value image). A process of forming a multi-value image on the photosensitive medium 41 using the binary image data will be described below.

FIGS. 4a and 4b are illustrative of the concept of expressing a multi-value image based on binary image data.

As shown in FIG. 4a, a multi-value image in a certain region, which is composed of a first tone 0A through a ninth tone 9A, comprises a succession of several joined tones. As shown in FIG. 4b, the region is divided into subregions, and each of the subregions is further divided into a matrix of 3×3 or nine smaller blocks. Each of the blocks is expressed by a binary value, i.e., 1 or 0. The ten tones or gradations ranging from the first tone 0A through the ninth tone 9A are expressed by the number of the binary value 1 (i.e., the number of blocks that are shown hatched). The subregions are successively exposed to light while the photosensitive medium 41 is being moved, so that the continuous-tone image can be printed.

The subregions may continuously be recorded with their adjacent boundary lines adjoining each other, or may be recorded with their adjacent boundary lines overlapping each other. Such different recording modes can easily be performed by controlling the positioning unit 32.

In the illustrated embodiment, since the original 43 and the photosensitive medium 41 are positioned on and fixed to the same support table 35, they can be moved in synchronism with each other. Accordingly, an image can be read and recorded at the same time, and hence the time required to process the image is shortened.

The image data generator 31 comprises an image processing computer, for example. An image may be read out by a known image reader, and processed by the image processing computer. Alternatively, desired image information may be generated and then processed by the image processing computer. The image or image information thus processed can then be reproduced on the photosensitive medium 41 by the image recorder 29. A small-size liquid crystal panel for use in a viewfinder may be employed as the liquid crystal shutter matrix panel 26, or a color liquid crystal panel may be employed as the liquid crystal shutter matrix 26. Alternatively, a rotary color filter may be used to print a color image or print trichromatic images overlappingly.

An optical fiber bundle may be used in place of the focusing optical system 28, for guiding an image on the liquid crystal shutter matrix panel 26 to the photosensitive medium 41. Alternatively, a plurality of focusing optical systems 28 may be used to speed up the recording process.

When the image is read from the original 43 by the image reader 47, the original 43 may be illuminated from its back, and light which has passed through the original 43 may be detected by the CCD camera 46.

In the printing system incorporating the liquid crystal shutter matrix panel according to the present invention, the liquid crystal shutter matrix panel is illuminated with light from the light source, and the shutter of the liquid crystal shutter matrix panel is driven by a signal from the image data generator to form an image on the liquid crystal shutter matrix panel. The image can then be focused onto the photosensitive medium by the focusing optical system. The printing system of such an arrangement is relatively simple in structure, and inexpensive to manufacture. The photosensitive medium can be exposed to the image light once over an area which corresponds to the size of the liquid crystal shutter matrix panel. Therefore, the exposure speed, i.e., the printing speed can be increased.

The liquid crystal shutter matrix panel and the photosensitive medium are moved relatively to each other to position the liquid crystal shutter matrix panel successively into the position over the photosensitive medium, so that successive images can be formed on the photosensitive medium through the multi-imaging process.

In addition, the light source emits coherent light which is subject to a less loss and can be utilized with higher efficiency than with the conventional printer with a CRT. Therefore, the exposure speed (printing speed) can be increased. Since the liquid crystal shutter matrix panel is bright, photosensitive mediums having good photosensitive characteristics may be employed for the reproduction of highly fine images.

The image reader comprises the light source for illuminating an image carried on the photosensitive medium and the light detecting means detecting light which is produced when the image on the photosensitive medium is illuminated by the light source. Since the image on the photosensitive medium is read out by the image reader and then supplied to the image data generator, the original image can be digitally processed by the image data generator for the removal of a background image, the conversion into a line-art image, the correction of a blurred image, so on. The image data generator is in the form of a microcomputer or the like which can process the original image digitally according to various software programs for the removal of a background image, the conversion into a line-art image, the correction of a blurred image, etc. The printing system according to the present invention is relatively simple in construction and can produce highly fine images.

Although a certain preferred embodiment has been shown and described, it should be understood that many changes and modifications may be made therein without departing from the scope of the appended claims.

What is claimed is:

1. A printing system comprising:
    a liquid crystal shutter matrix panel;
    illuminating means for illuminating said liquid crystal shutter matrix panel from the back thereof;
    a photosensitive medium disposed in confronting relation to said illuminating means with said liquid crystal shutter matrix panel interposed therebetween;
    positioning means for positioning said liquid crystal shutter matrix panel and said photosensitive medium longitudinally and transversely with respect to each other;
    image data generating means for generating image data;
    driving means for driving a shutter of said liquid crystal shutter matrix panel based on the image data generated by said image data generating means; and
    focusing means for focusing an image formed by said liquid crystal shutter matrix panel onto said photosensitive medium.

2. A printing system according to claim 1, wherein said image data generating means comprises:
    illuminating means for illuminating an image carried on an original; and
    image reading means movable with respect to said original, for reading light reflected or transmitted by the image which is illuminated by said illuminating means, thereby to produce the image data, whereby the shutter of said liquid crystal shutter matrix panel can be driven by said driving means based on said image data.

3. A printing system according to claim 1, wherein said liquid crystal shutter matrix panel comprises:
    a liquid crystal panel composed of a pair of transparent plates and a liquid crystal sealed therebetween;
    polarizing films mounted on said liquid crystal panel;
    drive electrodes mounted in said liquid crystal panel and drivable depending on the image data by said driving means.

4. A printing system according to claim 2, wherein said positioning means comprises means for moving said photosensitive medium and said original in synchronism with each other until said photosensitive medium and said original are positioned with respect to said liquid crystal shutter matrix panel and said image reading means, respectively.

5. A printing system according to claim 2, wherein said image reading means comprises:
    a photoelectric transducer for converting the light reflected by or transmitted through the image into an electric signal to be converted into said image data; and
    focusing means for focusing the light reflected by or transmitted through the image onto said photoelectric transducer.

6. A printing system according to claim 1, wherein said image data generating means further comprises:
means for performing data processing upon an original image, thereby creating said image data.

7. A printing system according to claim 1, wherein said focusing means focuses said image formed by said liquid crystal shutter matrix panel onto a subregion of said photosensitive medium, and said positioning means moves said photosensitive medium to position successive subregions of said photosensitive medium with respect to the focused image.

8. A printing system according to claim 1, wherein said focusing means comprises means for magnifying said image formed by said liquid crystal shutter matrix panel.

9. A printing system according to claim 1, wherein said focusing means comprises means for reducing said image formed by said liquid crystal shutter matrix panel.

* * * * *